United States Patent [19]

Park

[11] Patent Number: 5,417,377
[45] Date of Patent: May 23, 1995

[54] DRUM REEL WITH SPOOL BRAKE

[75] Inventor: Bo K. Park, Pusan, Rep. of Korea

[73] Assignee: Silver Star Co., Ltd., Pusan, Rep. of Korea

[21] Appl. No.: 175,461

[22] Filed: Jan. 3, 1994

[30] Foreign Application Priority Data

Sep. 16, 1993 [KR] Rep. of Korea ............... 1993-18775

[51] Int. Cl.$^6$ .......................................... A01K 89/033
[52] U.S. Cl. .................................. 242/292; 188/329; 242/301
[58] Field of Search ............... 242/286, 285, 292, 301; 188/329

[56] References Cited

U.S. PATENT DOCUMENTS

| 1,095,807 | 5/1914 | Burt | 242/301 |
|---|---|---|---|
| 1,616,659 | 2/1927 | Heany | 188/329 |
| 1,995,221 | 3/1935 | Peel et al. | 242/301 |
| 2,516,517 | 7/1950 | Hutchison | 188/329 |
| 2,610,002 | 9/1952 | Surber | 242/292 |
| 3,532,288 | 10/1970 | Di Cicco | 242/301 |
| 3,698,502 | 10/1972 | Patin | 188/329 |
| 4,196,871 | 8/1980 | Kobayashi | 242/301 |
| 4,854,007 | 8/1989 | Cheng | 188/329 |
| 5,062,506 | 11/1991 | White | 188/329 |

FOREIGN PATENT DOCUMENTS 21365 of 1914 United Kingdom ............... 242/292

Primary Examiner—Joseph J. Hail, III
Attorney, Agent, or Firm—Richard T. Holzmann

[57] ABSTRACT

A drum reel with a spool brake for balancing the differential rotational velocities of spool and fishline. The spool brake comprises an annular brake drum and a band brake having a pair of arcuate brake parts connected to each other and placed in the brake drum. A brake operating member, having a link engaging part, is placed between the free ends of the brake parts in order to bias the brake parts in opposed directions. A link is provided on one of the frames and engages the brake operating member for rotating this member, and has a slit engaging with the link engaging part such that rotation of the slit causes rotation of the member. A lever is interposed between the frames and hinged to the link such that the lever moves rotating the link and in turn rotating the brake operating member.

7 Claims, 2 Drawing Sheets

DRUM REEL WITH SPOOL BRAKE

FIELD OF THE INVENTION

The present invention relates in general to fishing equipment, and more particularly to a drum type reel.

BACKGROUND OF THE INVENTION

In a fishing rod having a conventional drum reel, the spool should be prevented from rotating before the sinker with a baited hook is cast. Thereafter, the spool should be released at the same time as the sinker is thrown to allow the spool to rotate and to unwind the line. When operated in this manner, the rotational velocity of the spool is relatively greater than that of the unwinding of the line and thereby may cause entanglement and backlash. To prevent this backlash, one's thumb is normally used to control the rotational velocity of the spool.

Thumb control, however, generates friction between the thumb and the spool resulting in thumbache. Therefore, use of the conventional drum reel is accompanied with inconvenience and pain.

SUMMARY OF THE INVENTION

It is, therefore, an object of the present invention to overcome this problem by providing a drum reel with a spool brake which brake comprises a drum brake cooperating with a lever and thereby controls or stops the spool rotation by levering action.

In order to accomplish this objective, a drum reel with a spool brake in accordance with a preferred embodiment of the present invention comprises a spool, rotatably supported between a pair of side frames, and the spool brake comprising: an annular brake drum integrally extending from a side end of the spool to the outside; a drum brake placed in the brake drum such that its outer surface faces an inner surface of the brake drum, the drum brake comprising a pair of arcuate brake parts connected to each other by inserting an insert end of one of the brake parts into a reception end of the other brake part and by hinging the ends to each other by hinge means, the other ends of the brake parts being normally spaced at a predetermined interval; a brake operating member rotatably axially placed between the spaced ends of the brake parts in order to bias the brake parts in opposed directions, the member having a brake operating part and a link engaging part, the brake operating part contacting with the spaced ends of the brake parts; a link provided on an outer surface of one of the frames and engaging with the brake operating member for rotating the member, the link having a slit engaging with the link engaging part of the member such that rotation of the slit causes rotation of the member; and a lever axially interposed between the side frames and hinged to the link by a shaft such that the lever circumferentially moves in order to rotate the link about the slit of the link and in turn rotate the brake operating member, the lever having a longitudinal hole on a side end thereof for receiving a guide pin of a corresponding frame.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
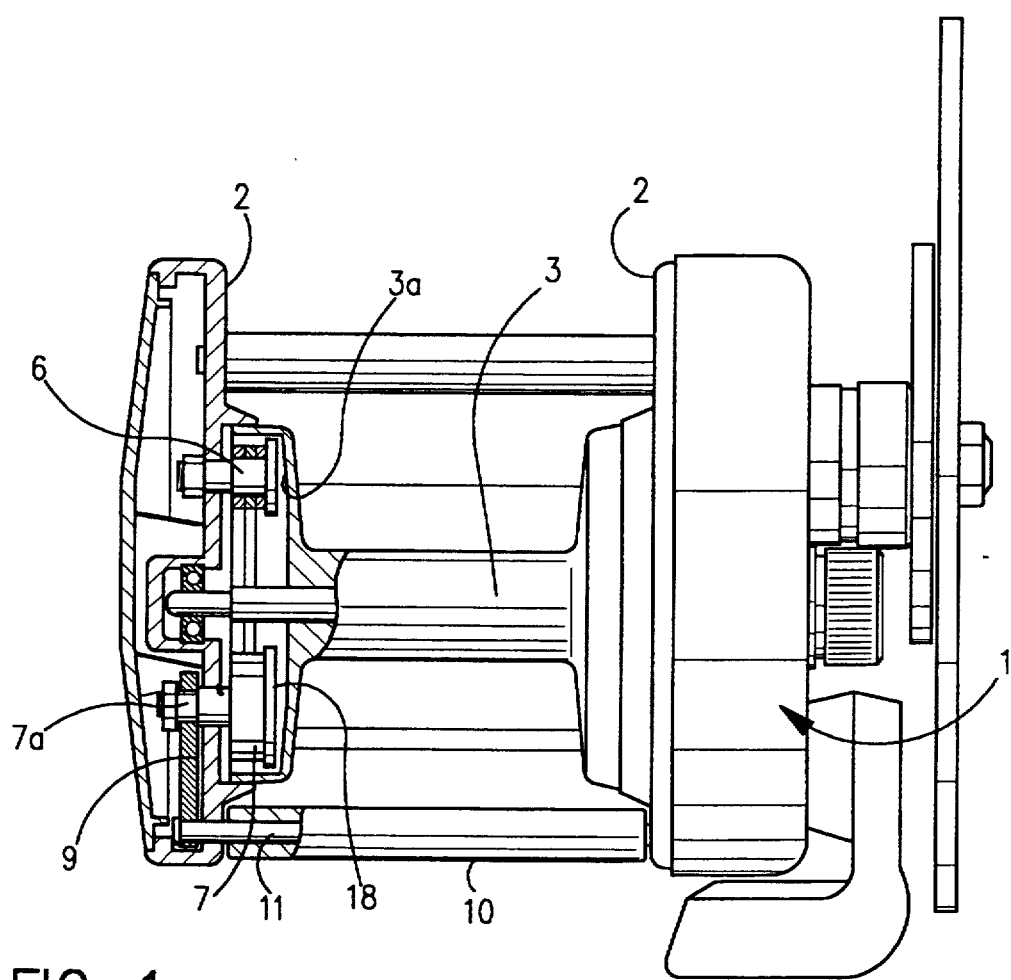
FIG. 1 is a partial sectional view of a drum reel having a spool brake in accordance with an embodiment of the present invention.
Figure 2:
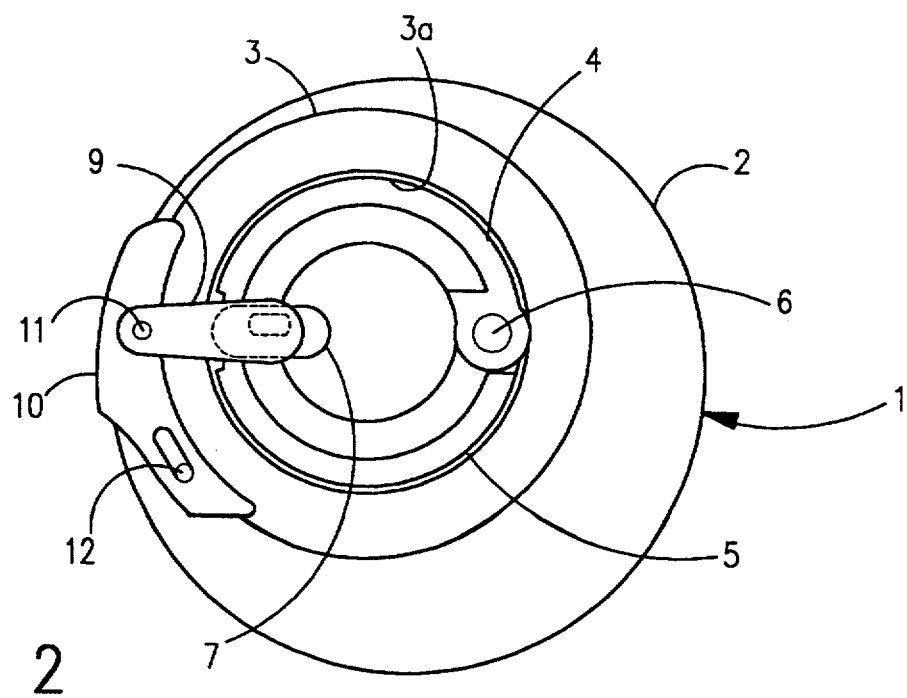
FIG. 2 is a side view of the drum reel of FIG. 1, showing the position of the spool brake.

With reference to the drawings, there is shown a drum reel having a spool brake in accordance with an embodiment of the present invention. The drum reel 1 includes a spool 3 rotatably supported between a pair of side frames 2. Spool 3 is provided on a side end thereof with an annular flange extending from the circular periphery of the side end to the outside, thus to form a brake drum 3a of the spool brake. The spool brake also includes a drum brake which is received by brake drum 3a of spool 3 such that its outer surface faces the inner surface of brake drum 3a. Here, the drum brake comprises two arcuate brake parts, that is, first and second brake parts 4 and 5 connected to each other. In order to connect brake parts 4 and 5 to each other, a reception end 4a of the first part 4 receives an insert end 5a of the second part 5 and is screwed by a bolt 6 such that the two parts 4 and 5 are turned about bolt 6. The other ends or the free ends of the two parts 4 and 5 facing each other are spaced at a predetermined interval. A brake operating member 8 is axially placed in the space defined between the other ends of parts 4 and 5. This member 8 has a brake operating part 7, having a semi-ovoid cross section, and a link engaging part 7a which is axially cut off in order to have opposed plane surfaces. This member 8 is also provided with a threaded end.

Figure 4:
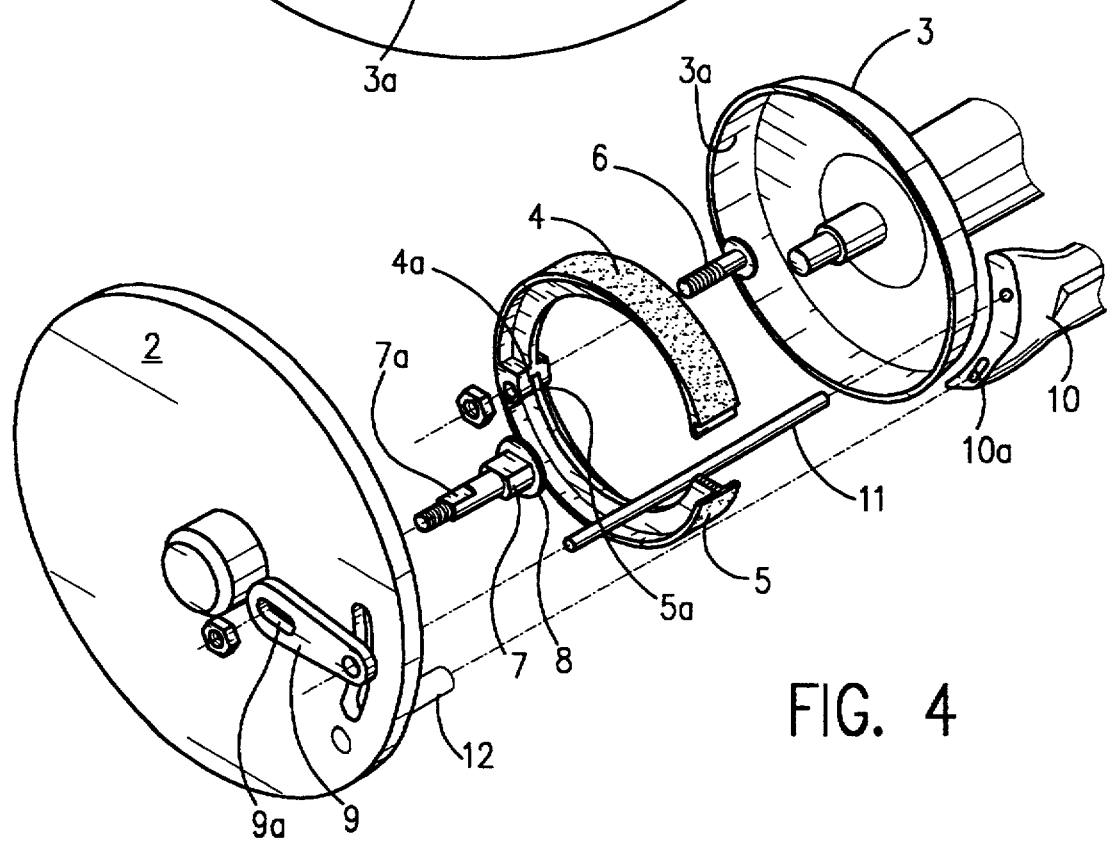
FIG. 4 is an exploded perspective view of the spool brake of the present invention.

In addition, a link 9 is provided on an outer surface of frame 2 and engages with member 8 in order to operate this member and to operate the drum brake. In order to connect member 8 to link 9, the threaded end of member 8 penetrates a hole of frame 2 such that the link engaging part 7a of member 8 engages with a slit 9a of link 9 and is tightened by a nut. Here, due to the shape of slit 9a of link 9 and link engaging part 7a of brake operating member 8, rotation of slit 9a causes rotation of member 8. An end of link 9 opposed to the other end having slit 9a is hinged to a longitudinal lever 10 by shaft 11, so that link 9 turns about slit 9a when lever 10 is shifted. As best seen in FIG. 4, this lever 10 is axially placed between the pair of side frames 2, and shaft 11 hinging link 9 to lever 10 passes through longitudinal openings of frames 2, so that this lever 10 circumferentially moves under the guide of the longitudinal openings of frames 2. A longitudinal hole 10a is formed on the side of lever 10 and receives a guide pin 12 formed on the inner surface of a corresponding frame 2 such that the circumferential movement of lever 10 is additionally guided by guide pin 12.

The operational effect of the spool brake is explained below.

Figure 3:
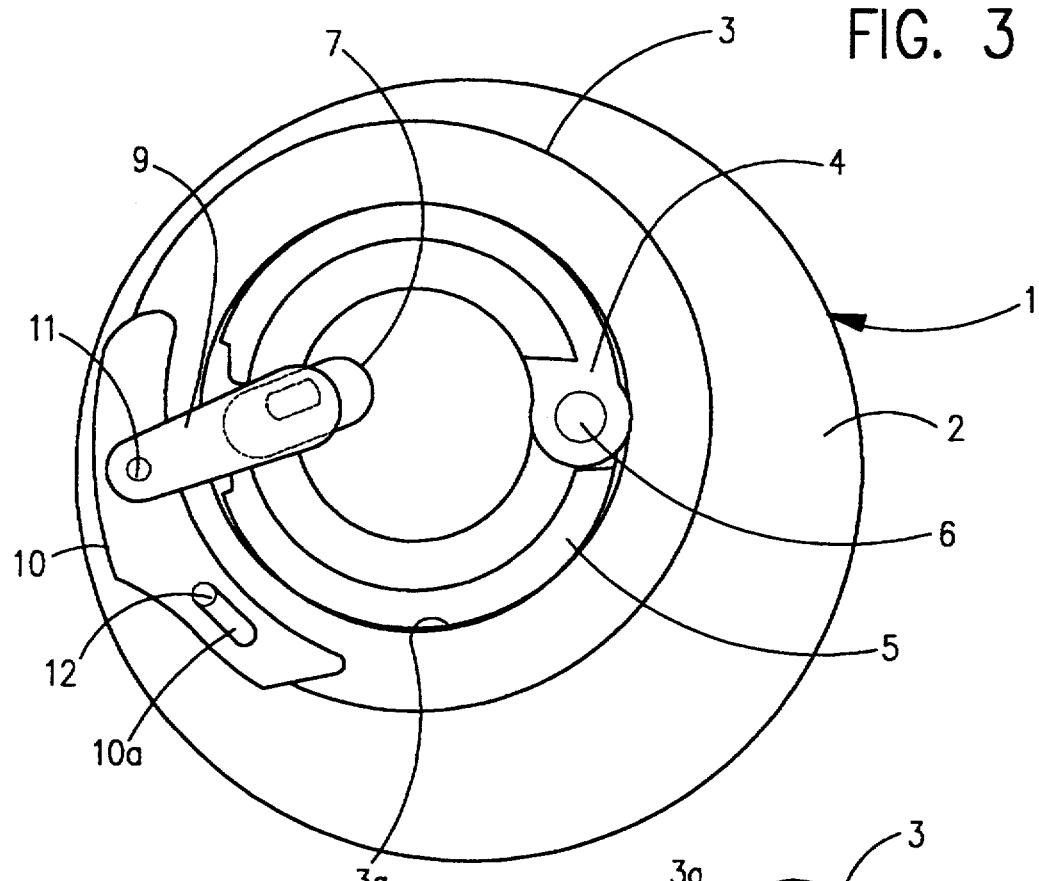
FIG. 3 is a side view of the drum reel of FIG. 1, showing a braking operation of the spool brake.

In order to prevent spool 3 from rotating before a sinker with a baited hook is cast, lever 10 is pushed in a predetermined direction as shown by the arrow in FIG. 3, so that link 9 hinged to lever 10 turns in the same direction about slit 9a. At this time, slit 9a rotates in the same direction and this causes brake operating member 8 engaged with slit 9a to rotate in the same direction. Hence, brake operating part 7 of member 8 biases the free ends of brake parts 4 and 5 in opposed directions, so that these parts 4 and 5 are diverged about 6 and their outer surfaces come into close contact with the inner surfaces of brake drum 3a of spool 3, thus generating a frictional force between the drum brake and brake drum 3a preventing spool 3 from rotating.

Lever 10 is released at the same time that the sinker is cast, so that the sinker with the baited hook flies to a desired fishing position due to centrifugal force and the line connected to the sinker unwinds from the rotating spool following the sinker.

At this time, backlash caused by entanglement of the line may occur since the rotational velocity of spool 3 is relatively greater than the unwinding velocity of the line as described above. In order to prevent this backlash by balancing these velocities, lever 10 is appropriately controlled so as to generate a frictional force between the drum brake and brake drum 3a in the same manner as described above.

In operation of the spool brake, the circumferential movement of lever 10 is guided by both the longitudinal openings and guide pin 12 of frames 2, the former receiving shaft 11 and the latter being received in longitudinal holes 10a of lever 10. Guide pin 12 in engaging the longitudinal hole 10a of lever 10 also functions as a retaining member for retaining the movable position of lever 10 axially interposed between side frames 2. On the other hand, link 9 of which slit 9a engages with link engaging part 7a of brake operating member 8 allows this member to be precisely controlled, thereby securing a reliable braking operation.

As described above, in a drum reel with a spool brake in accordance with the present invention, a drum brake comprising a pair of brake parts connected to each other is received by a brake drum of a spool such that it generates a frictional force between its outer surface and the inner surface of the brake drum. The drum brake is operated by an operating member, cooperating with a link and a lever hinged to each other by a shaft, in order to bias the free ends of the brake parts in opposed directions and to cause the outer surfaces of the brake parts and the inner surface of the brake drum to come together, thus to control or stop rotation of the spool and to provide a convenience in fishing using the drum reel.

The spool brake of this invention is controlled in its braking operation by levering. Hence, this spool brake controls the rotational velocity of the spool in order to balance the unwinding velocity of the line, thus to reliably prevent backlash or entanglement of the line caused by these differential velocities.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A drum reel having a spool rotatably supported between a pair of side frames comprising:
    a spool brake further comprising:
        an annular brake drum extending from a side end of the spool toward the outside end of a first side frame;
        a drum brake attached to said first side frame and placed in said brake drum, said drum brake having a pair of arcuate brake parts having inner and outer surfaces and hinged to each other at their first ends;
        a brake operating member placed between spaced second ends of the arcuate brake parts connected to said first side frame;
        a link mounted on the outside of said first side frame engaging with said brake operating member; and
        a lever placed axially between said side frames and hinged to said link and engaged with a second side frame.

2. The drum reel according to claim 1 wherein said annular brake drum extends integrally from said side end of the spool toward the outside end of said first side frame.

3. The drum reel according to claim 1 wherein said drum brake is placed in said annular brake drum such that outer surfaces of the arcuate brake parts face an inner surface of said brake drum.

4. The drum reel according to claim 1, wherein an insert end of one of the arcuate brake parts is inserted into a reception slotted end of the other brake part, said ends being hinged to each other by hinge means, the second ends of the brake parts being normally spaced at a predetermined interval.

5. The drum reel according to claim 1 wherein said brake operating member is placed axially and rotatably between the spaced second ends of the arcuate brake parts in order to bias the arcuate brake parts in opposed directions, said member further comprising a brake operating part and a link engaging part integrally formed therefrom and attached on the outside of said side frame, said brake operating part contacting with said spaced second ends of the arcuate brake parts.

6. The drum reel according to claim 1, said lever further including a shaft connected to said lever and said link which circumferentially moves said lever in order to rotate said brake operating member, said lever having a longitudinal hole on a side end thereof for receiving a guide pin of said first side frame.

7. The drum reel according to claim 1 wherein said link rotatably engages said brake operating member, said member further comprising a brake operating part and a link engaging part, said link having a slit therein for engaging with said link engaging part of said member such that rotation of said slit causes rotation of said member.

* * * * *